UNITED STATES PATENT OFFICE.

CHARLES U. YATES, OF BARTON, NEAR MANCHESTER, COUNTY OF LANCASTER, ENGLAND, AND PAUL DEGENER, OF BRUNSWICK, GERMANY; SAID YATES ASSIGNOR TO SAID DEGENER.

TREATMENT OF SACCHARINE JUICES.

SPECIFICATION forming part of Letters Patent No. 255,830, dated April 4, 1882.

Application filed December 20, 1881. (No specimens.)

*To all whom it may concern:*

Be it known that we, CHARLES U. YATES, of Barton, near Manchester, county of Lancaster, England, and Dr. PAUL DEGENER, of Brunswick, in the Duchy of Brunswick, Germany, have invented certain new and useful Improvements in the Treatment of Saccharine Juices, of which the following is a specification.

This invention has for its object a mode of treatment of saccharine juice or liquor, by which the generation of molasses is effectually limited, while crystallized sugar is formed more readily and in greater quantity. By the boiling of saccharine liquor, even when such boiling takes place under vacuum, a portion of the crystallizable or already crystallized sugar is always converted into uncrystallizable sugar, which passes into the molasses forming the residue of the manufacture of refined sugar, and the quantity of which increases as the liquor is exposed to a higher temperature and the boiling operation extended. The loss of sugar caused by this conversion is, however, not the only disadvantage, because, in proportion as the quantity of molasses becomes greater, the formation and the separation of sugar crystals are retarded. There is thus a direct and an indirect loss of sugar.

The object of our invention is now to avoid this disadvantage and to increase the quantity of crystallized sugar obtained from the liquor.

While in the highest vacuum hitherto applied in the operation of boiling and concentrating saccharine liquor there is a pressure corresponding to a boiling-temperature which varies between 60° and 75° centigrade, we diminish the pressure by so much that the boiling-temperature does not exceed 57.5° centigrade. This diminution allows the temperature of the steam used for heating the vacuum-pans (as well such as are used for concentrating the juice as those employed for boiling the sirup) to be reduced without lessening the usual difference of from 60° to 80° centigrade between the temperature of the steam and of the liquor. In consequence of such reduction the prejudicial influence of a high temperature on the latter is avoided; and, moreover, the said difference being maintained, the reduction of temperature (as well of the liquor to be treated as of the heating-surface of the pan) does not give rise to any prolongation of either the evaporating or the boiling process. For the purpose of attaining a higher vacuum, such as stated, we in the first place use a more perfect air-pump than those at present employed, and by preference a pump of Windhausen's design—*i. e.*, a pump in which two pumping-cylinders of different capacity are combined; but any other evacuating apparatus adapted to create the desired vacuum may be used. In all cases the mixture of air and vapor coming from the pans may be freed, upon its passage to the pump, of the greater portion of the vapor by cold water injected into the same as usual, or by any other system of condensation; and, if it is considered necessary to eliminate the residue of vapor yet remaining, we employ hygroscopic substances—*i. e.*, substances adapted to absorb moisture—as, for instance, concentrated sulphuric acid, potash, quicklime, chloride of calcium, or other agents of similar capacities. When sulphuric acid is made use of the same may be contained in an air-tight horizontal cylinder communicating at one end with the pan, while at the other end it is provided with a dome to which the pipe leading to the air-pump is attached. For the purpose of promoting the absorption the cylinder should be furnished with a suitable apparatus for stirring the acid. In case solid substances—such as those hereinbefore mentioned—are to be employed, they may be spread out on platforms inclosed in the absorbing-vessel, which is inserted between the pan and the pump. Another method of using the said absorbents consists in their injection in a state of spray or powder into the absorbing-vessel. The manner in which they are used may, however, be varied. Which absorbent is to be employed in any special case depends upon local conditions—such as the price of the substances, the arrangements of the factory, &c.

We claim as our invention—

For the purpose of preventing the formation of an excessive quantity of molasses by the concentration of saccharine juice and the boiling of the sirup, the execution of these operations in a vacuum corresponding to a boiling-temperature of the liquor which does not exceed 57.5° centigrade, and, in case the evacuating apparatus should not be powerful enough to create the degree of rarefaction of air, the use of hygroscopic substances for the absorption of the vapors generated in the concentrating or boiling pans, and which are not condensed by the ordinary means, substantially as and for the purpose described.

In testimony whereof we have signed our names to this specification in the presence of two subscribing witnesses.

CHARLES U. YATES.
    DR. PAUL DEGENER.

Witnesses:
 CARL PIEPER,
 BARTHOLD ROI.